US012611831B2

(12) United States Patent
Zielinski et al.

(10) Patent No.: US 12,611,831 B2
(45) Date of Patent: Apr. 28, 2026

(54) DEVICE FOR COOLING AND STABILIZING THE CURED TYRE

(71) Applicant: URMA CONTROLS sp. z o.o., Olsztyn (PL)

(72) Inventors: Adam Zielinski, Olsztyn (PL); Roman Szewczyk, Olsztyn (PL)

(73) Assignee: URMA CONTROLS sp. z o.o., Olsztyn (PL)

( * ) Notice: Subject to any disclaimer, the term of this patent is extended or adjusted under 35 U.S.C. 154(b) by 161 days.

(21) Appl. No.: 18/619,575

(22) Filed: Mar. 28, 2024

(65) Prior Publication Data

US 2024/0399688 A1     Dec. 5, 2024

(30) Foreign Application Priority Data

May 29, 2023     (EP) ..................................... 23461599

(51) Int. Cl.
*B29D 30/00*          (2006.01)
*B29C 35/00*          (2006.01)
*B29C 35/16*          (2006.01)
*B29D 30/06*          (2006.01)

(52) U.S. Cl.
CPC ........ *B29D 30/0016* (2013.01); *B29C 35/002* (2013.01); *B29C 35/16* (2013.01); *B29D 30/0643* (2013.01); *B29D 2030/0027* (2013.01)

(58) Field of Classification Search
CPC ................................................. B29D 30/0643
See application file for complete search history.

(56) References Cited

U.S. PATENT DOCUMENTS

| | | | | | |
|---|---|---|---|---|---|
| 4,092,090 | A | * | 5/1978 | Yuhas | B29D 30/0603 425/58.1 |
| 4,124,337 | A | * | 11/1978 | Martin | B29D 30/0643 425/58.1 |
| 2011/0189324 | A1 | * | 8/2011 | Fujieda | B29C 35/0222 425/58.1 |

FOREIGN PATENT DOCUMENTS

| | | | | | |
|---|---|---|---|---|---|
| JP | 2009039861 | A | * | 2/2009 | B29D 30/0643 |

OTHER PUBLICATIONS

Translation of JP-2009039861-A (Year: 2009).*

* cited by examiner

*Primary Examiner* — John J DeRusso
(74) *Attorney, Agent, or Firm* — Ziegler IP Law Group, LLC.

(57)          ABSTRACT

A device for cooling and stabilizing a cured tyre, includes a beam with a non-movable element; a movable element; a guide; and an actuator arranged to move the movable element along the guide relative to the beam. One of the non-movable element and the movable element includes a shaft having at its end a spline, and a first disc in the axis of which the shaft is arranged. The other of the non-movable element and the movable element includes a closing mechanism including a second disc with a threaded axial opening, a main electric motor and a securing socket having a cylindrical shape with a thread. The closing mechanism is configured to cooperate with the shaft via the securing socket corresponding to the shape of the spline and to adjust the size of the tyre through sliding, along the axis, of the second disc.

11 Claims, 4 Drawing Sheets

DEVICE FOR COOLING AND STABILIZING THE CURED TYRE

FIELD OF THE INVENTION

The invention provides a device for cooling and stabilizing a tyre after vulcanization process, in order to avoid tyre deformation during the cooling process.

PRIOR ART

In the prior art devices are known for performing cooling and stabilization processes on a vulcanized tyre, so called PCI—post cure inflator.

Document DE 102015016882 A1 describes a device for processing tyres after vulcanization process, having at least one cleaning station with a PCI for pressurizing the interior of the tyre with an auxiliary gas wherein the at least one cleaning station is configured to assist finishing processing of produced tyres affected by residual heat.

Document U.S. Pat. No. 6,890,165 B2 discloses a device for inflating and cooling a tyre after vulcanization. It comprises a ring at the side of a body and a ring at the mounting/removing side. Both rings are formed with a toe receiving surfaces opposite to the outer surface of a vulcanized tyre toe. A vulcanized tyre is cooled and its shape is stabilized in a state in which the vulcanized tyre is retained between the toe retaining surfaces. The ring from at the mounting/removing side is provided with a coupling catch for releasable gripping the tyre toe. The device presented in the document comprises an electric motor arranged between two stations, and locking of the tyre is effected as a result of threaded connection of the elements. This solution presents a very big and complicated frame arranged for transfer of considerable loads.

BRIEF DESCRIPTION OF THE INVENTION

It is the aim of the invention to provide a device for cooling and stabilizing the cured tyre to ensure adjustment of the tyre compression in the device and enhance process effectiveness through preventing damage to the tyre.

It is the object of the invention to provide a device for cooling and stabilizing the cured tyre, comprising: a beam that comprises at least one non-movable elements; at least one movable element; at least one guide to enable movement of the movable element along the beam; at least one actuator arranged to move the movable element relative to the beam. The non-movable element or the movable element comprises a shaft having at its end at least one spline, and a first disc in the axis of which the shaft is arranged. The other one of the non-movable element or movable element, respectively, comprises a closing mechanism comprising: a second disc with threaded axial opening, a main electric motor and a securing socket having a cylindrical shape with a threat at least at a portion of its height. The closing mechanism is configured to cooperate with the shaft via a securing socket shaped correspondingly to at least one spline and to adjust the tyre height by sliding, along the axis, a second disc. The main electric motor is coupled with a securing socket so that it enables rotation of the securing socket. On the securing socket, in its threaded portion, the second disc is secured so that rotation of the securing socket causes the second disc slide along the securing socket. The closing mechanism is configured so that adjustment of the second disc in parallel to the beam axis is possible.

Preferably, the non-movable element is arranged at the first end of the beam, and the movable element is secured to the guide at the other end of the beam.

Preferably, the device comprises two movable elements, namely a first movable element and a second movable element, where the non-movable element is secured to the beam so that it is arranged between the first movable element and the second movable element, and the non-movable element comprises two first discs with a shaft, where the first disc is oriented towards the first end of the beam, and the other first disc is oriented towards the other end of the beam.

Preferably, to the non-movable element an overstroke limitation unit is secured, comprising an additional electric motor and a pinion, where each of the first discs comprises a toothed wheel secured to the first disc at the side of the non-movable element, positioned on the axis of the first disc and the axis of the shaft, to cooperate with the pinion, and the shaft has a thread on its outer surface, at least at a portion of the shaft height, and the additional electric motor is coupled with the pinion so that the overstroke limitation unit is capable to control the distance to at least one first disc, and the pinion is coupled with at least one toothed wheel of at least one first disc so that the rotational movement of the pinion forces a plane movement of at least one first disc in parallel with the beam axis.

Preferably, the overstroke limitation unit comprises at least one transmission gear, preferably a planetary gear or a worm gear.

Preferably, the device comprises two guides.

Preferably, the guides are arranged in parallel relative to the beam axis.

Preferably, the actuator is a pneumatic or hydraulic actuator.

Preferably, the device comprises a base secured to the first end of the beam, preferably, perpendicularly to the beam axis.

Preferably, at least one non-movable element is in a form of a first support beam, preferably arranged perpendicularly relative to the beam axis.

Preferably, at least one movable element is in a form of a second support beam, preferably arranged perpendicularly relative to the beam axis.

ADVANTAGEOUS EFFECTS OF THE INVENTION

Due to the use of the device according to the invention it is possible to carry out the process of cooling the cured tyre. Moreover, the tyre is not prone to damage or destruction, because due to the use of an electric motor there is no possibility for occurrence of oil leakage from hydraulic installation and soiling of the tyre being processed. Furthermore, the frame of the device is lightweight and the device comprises an additional electrically driven control mechanism to prevent overcompression of the tyre when arranged in the device.

BRIEF DESCRIPTION OF THE DRAWINGS

The invention will be presented in preferable embodiments with reference to the enclosed drawings wherein.

DETAILED DESCRIPTION OF A PREFERABLE
EMBODIMENT OF THE INVENTION

Figure 2:
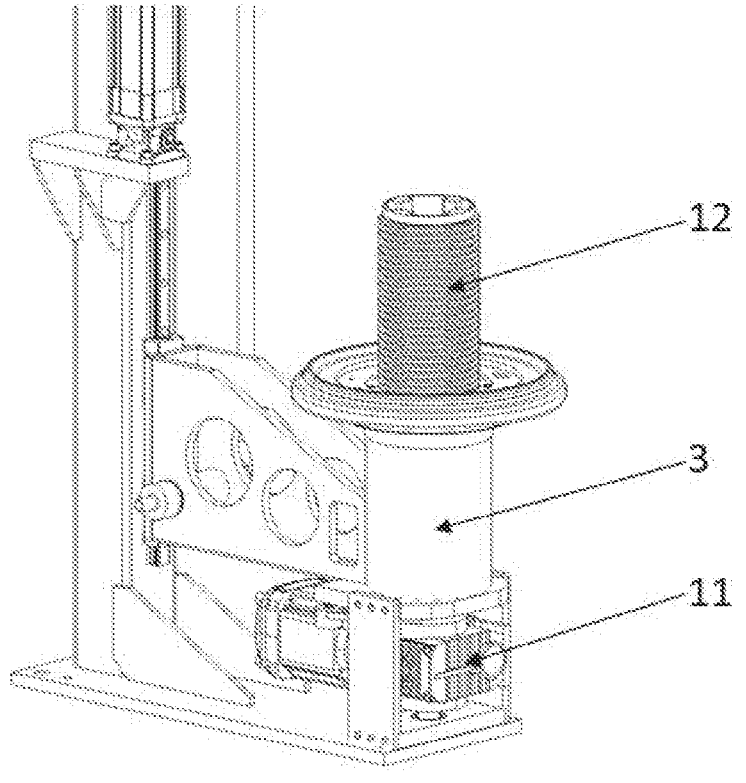
FIG. 2 shows a view of a movable element.
Figure 3:
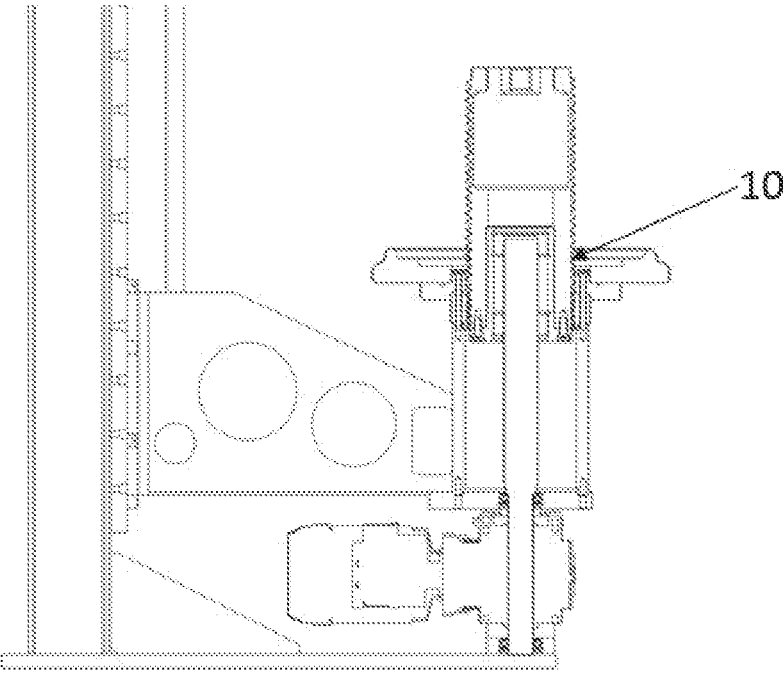
FIG. 3 shows a cross-section of the movable element.

A device, according to the first preferable embodiment of the invention, comprises a beam 1 which comprises at least one non-movable element 2. The device also comprises at least one movable element 3 and at least one guide 4 to enable movement of the movable element 3 along the beam 1. The device also comprises at least one actuator 5 arranged to move the movable element 3 relative to the beam 1. The actuator 5 is in a preferable embodiment a pneumatic actuator or a hydraulic actuator. The non-movable element 2 or movable element 3 comprises a shaft 6 having at its end at least one spline 7, and a first disc 8 in the axis of which the shaft 6 is arranged. Respectively, the other one of the non-movable element or movable element comprises a closing element shown in FIGS. 1 and 2. The closing element comprises a second disc 9 with threaded axial opening 10 (FIG. 3), a main electric motor 11 and a securing socket 12 having a cylindrical shape with a thread at least at a portion of its height. The closing mechanism is configured to cooperate with the shaft 6 by means of the securing socket 12 corresponding to the shape of the at least one spline 7 and to adjust the size of the tyre through sliding along the axis of the second disc 9. The main electric motor 11 is coupled with the securing socket 12 so that it enables rotation of the securing socket 12. On the securing socket 12, on the threaded portion, the second disc 9 is mounted so that rotation of the securing socket 12 causes sliding of the second disc 9 along the axis of the securing socket 12.

In another embodiment, for the station for one tyre, at the first end of the beam 1 a non-movable element 2 is mounted. At the second end of the beam 1 the non-movable element 3 is mounted and configured so that it moves along the beam on a guide 4. As a result it is possible to use the device for tyres of varied thickness. Moreover, the device comprises an actuator 5. It is coupled with the movable element and therefore it is arranged for moving the movable element 3 relative to the beam 1.

Figure 1:
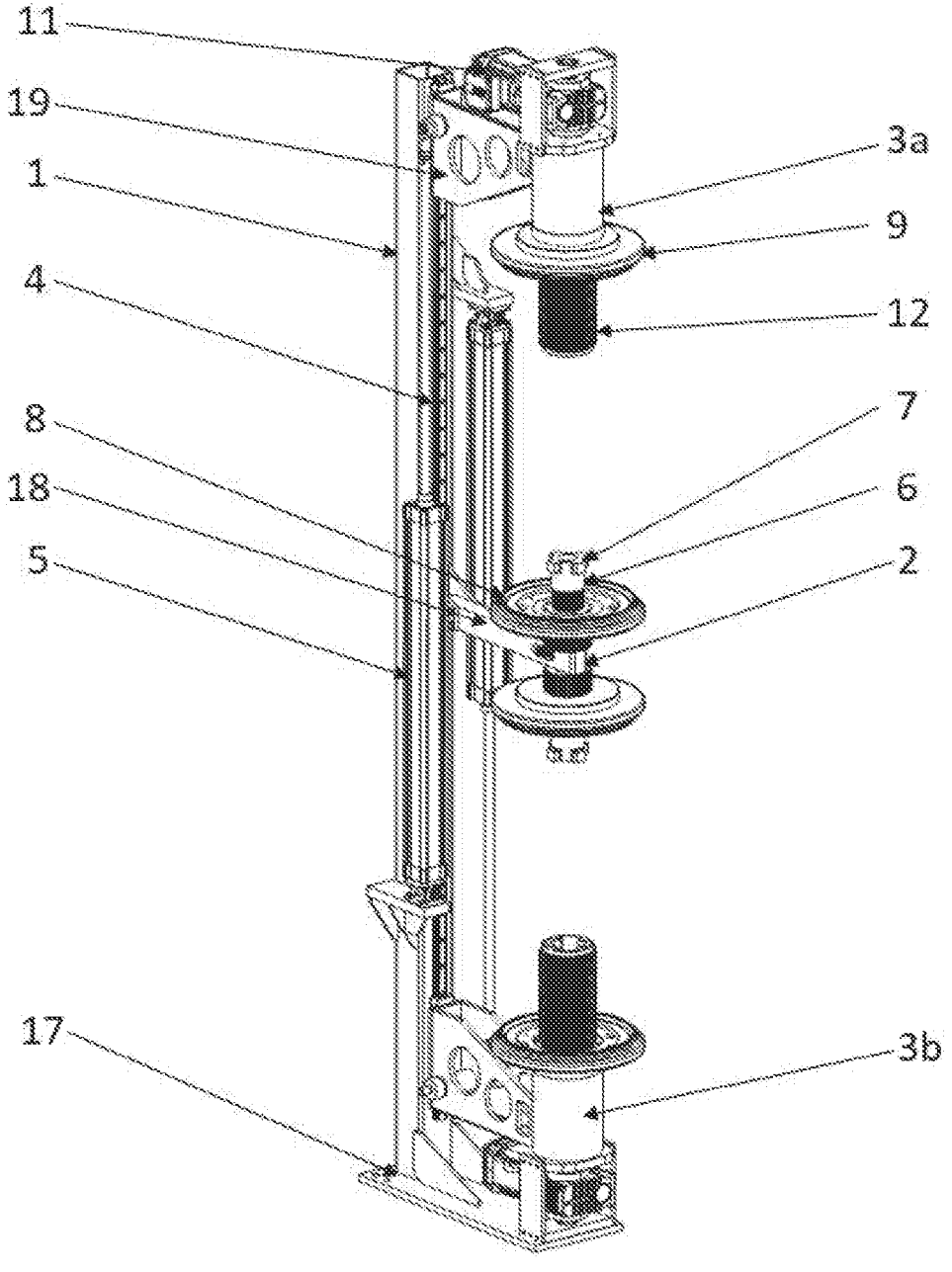
FIG. 1 shows a view of a device for cooling the cured tyre with two stations for positioning tyres.

According to yet another preferable embodiment, the device comprises two movable elements 3, namely a first movable element 3a and a second movable element 3b, as shown in detail in FIG. 1. The non-movable element 2 is secured to the beam 1 so that it is positioned between the first movable element 3a and the second movable element 3b. The non-movable element 2 comprises two first discs 8 with a shaft 6, wherein one first disc 8 is oriented towards the first end of the beam 1, and the first disc 8 is oriented towards the other end of the beam 1. Device thus configured enables simultaneous cooling two tyres. This makes it possible to save time and enhance effectiveness of the process.

Figure 4:
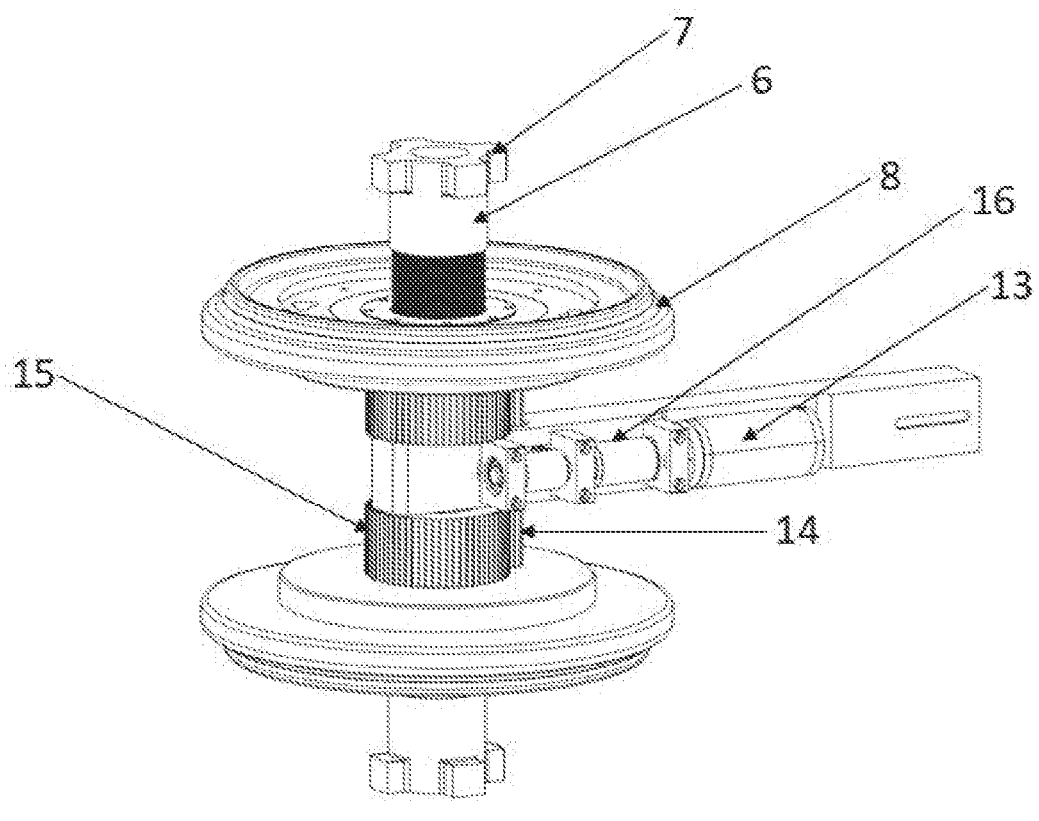
FIG. 4 shows a closing mechanism in an open position.

In another preferable embodiment of the invention, to the non-movable element 2 an overstroke limitation unit is mounted, shown in detail in FIG. 4. This mechanism provides additional adjustment of the tyre and prevents too strong compression of the tyre before it is pumped up, as well as adjustment of pressure within the tyre during cooling. The mechanism comprises an additional electric motor 13 and a pinion 14. To each of the first discs 8 a toothed wheel 15 is attached at the side of the non-movable element 2 that is positioned on the axis of the first disc 8 and the axis of the shaft 6. The tooted wheel 15 is configured to cooperate with the pinion 14, and the shaft 6 has a thread on the outer surface of at least a portion of the height of the shaft 6.

Additional electric motor 13 is coupled with the pinion 14 so that the overstroke limitation unit is arranged to control the distance to at least one first disc 8. The pinion 14 is coupled with at least toothed wheel 15 of at least one first disc 8 so that the rotational movement of the pinion 14 causes a plane motion of at least one first disc 8 in parallel to the axis of the beam 1.

Figure 5:
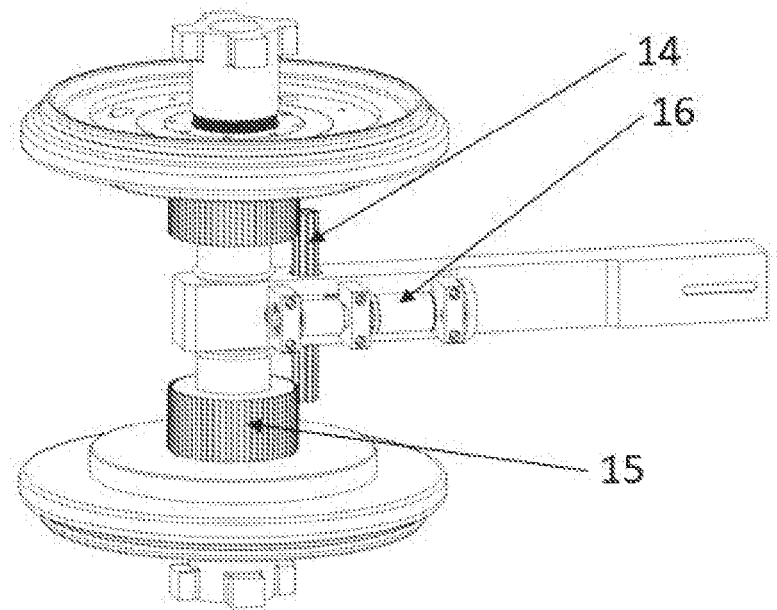
FIG. 5 shows a closing mechanism in a closed position.
Figure 6:
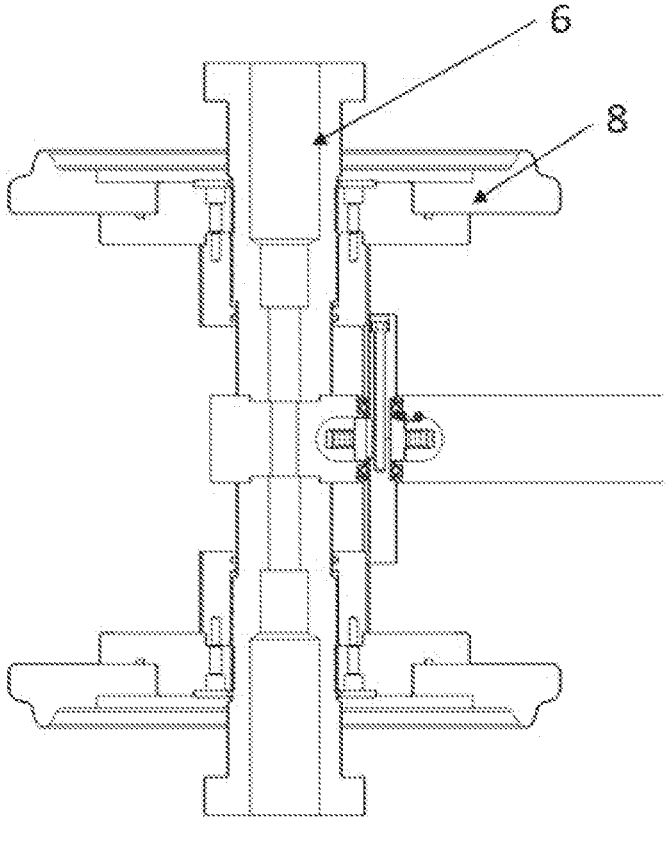
FIG. 6 shows a cross-section of a closing mechanism.

Preferably, the overstroke limitation unit comprises at least one transmission gear 16, preferably a planetary gear or a worm gear, as shown in FIGS. 4 and 5. This solution enables the use of an additional electric motor 13 with a lower power. The change of the disc position is also slower, and thus adjustment can be done easier. Additionally, the additional electric motor 13 is easier to be positioned along the non-movable element 2, as shown in FIGS. 4 and 5.

In a further embodiment of the invention, the device comprises two guides 4, preferably arranged in parallel to the axis of the beam. Preferably, each of the guides is arranged for movement of one movable element 3 thereon.

Preferably, the device comprises a base 17, secured to the first end of the beam 1, preferably perpendicularly to the axis of the beam 1, as shown in FIG. 1. Due to this it is possible to set the device on a flat foundation. In the case when the device is not provided with a base, the device according to the invention may be also secured directly to the wall.

Preferably, at least one non-movable element 2 is in a form of a first support beam 18, preferably positioned perpendicularly relative to the axis of the beam 1.

Preferably, at least one movable element 3 is in a form of a second support beam 19, preferably positioned perpendicularly to the axis of the beam 1.

Such construction of the first support beam 18 and the second support beam 19 enables easy securing of the non-movable element 2 or the movable element 3 to the beam 1 or to the guide 4.

LIST OF REFERENCE NUMERALS IN THE
DRAWINGS

1—beam
2—non-movable element
3—movable element
3a—first movable element
3b—second movable element
4—guide
5—actuator
6—shaft
7—spline
8—first disc
9—second disc
10—threaded axial opening
11—main electric motor
12—securing socket
13—additional electric motor
14—pinion
15—toothed wheel
16—transmission gear
17—base
18—first support beam
19—second support beam

The invention claimed is:

1. A device for cooling and stabilizing a cured tyre, comprising:
a beam that comprises at least one non-movable element;
at least one movable element;
at least one guide to enable movement of the movable element along the beam;
at least one actuator arranged to move the movable element relative to the beam;

wherein one of the non-movable element and the movable element comprises a shaft having at its end at least one spline, and a first disc in the axis of which the shaft is positioned;

and the other of the non-movable element and the movable element comprises a closing mechanism comprising:

a second disc with a threaded axial opening, a main electric motor; and a securing socket having a cylindrical shape with a thread at least at a portion of the height;

wherein the closing mechanism is configured to cooperate with the shaft by means of the securing socket corresponding to the shape of the at least one spline and to adjust the size of the tyre through sliding, along the axis, of the second disc, and the main electric motor is coupled with the securing socket so that it enables rotation of the securing socket, and on the securing socket, on the threaded portion, the second disc is mounted so that rotation of the securing socket causes sliding of the second disc along the axis of the securing socket;

and the closing mechanism is configured to enable adjustment of the second disc in parallel to the axis of the beam, wherein an overstroke limitation unit is mounted to the non-movable element and comprises an additional electric motor and a pinion, a toothed wheel is secured to the first disc at the side of the non-movable element, and positioned on the axis of the first disc and in the axis of the shaft, to cooperate with the pinion, the shaft has a thread on the outer surface of at least a portion of the height of the shaft, and the additional electric motor is coupled with the pinion so that the overstroke limitation unit is configured to adjust the distance to the first disc, and the pinion is coupled with the toothed wheel so that the rotation movement of the pinion causes a plane motion of the first disc in parallel to the axis of the beam.

2. The device according to claim 1, wherein the non-movable element is positioned at one end of the beam, and the movable element is secured to the guide at the other end of the beam.

3. The device according to claim 1, wherein the at least one movable element comprises a first movable element and a second movable element, wherein the non-movable element is secured to the beam so that it is positioned between the first movable element and the second movable element, and the non-movable element comprises two first discs with the shaft, and wherein one first disc is oriented towards a first end of the beam, and the other first disc is oriented towards a second end of the beam.

4. The device according to claim 1, wherein the overstroke limitation unit further comprises at least one transmission gear.

5. The device according to claim 4, wherein the at least one transmission gear comprises a planetary gear or a worm gear.

6. The device according to claim 1, wherein it the at least one guide comprises two guides.

7. The device according to claim 6, wherein the guides are positioned in parallel to the axis of the beam.

8. The device according to claim 1, wherein the actuator is a pneumatic or hydraulic actuator.

9. The device according to claim 1, further comprising a base secured to a first end of the beam, positioned perpendicularly to the axis of the beam.

10. The device according to claim 1, wherein the at least one non-movable element is in a form of a support beam, positioned perpendicularly relative to the axis of the beam.

11. The device according to claim 1, wherein the at least one movable element is in a form of a second support beam, positioned perpendicularly relative to the axis of the beam.

* * * * *